(12) United States Patent
Ishii et al.

(10) Patent No.: US 7,486,850 B2
(45) Date of Patent: Feb. 3, 2009

(54) OPTICAL SWITCH SYSTEM

(75) Inventors: Yuji Ishii, Fukuoka (JP); Kenji Rikimaru, Fukuoka (JP); Shinji Yamashita, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/494,625

(22) Filed: Jul. 28, 2006

(65) Prior Publication Data

US 2007/0230864 A1 Oct. 4, 2007

(30) Foreign Application Priority Data

Mar. 28, 2006 (JP) .............................. 2006-089246

(51) Int. Cl.
*G02B 6/42* (2006.01)

(52) U.S. Cl. .............................. 385/18; 385/15; 385/16; 385/17

(58) Field of Classification Search .................... 385/18
See application file for complete search history.

(56) References Cited

U.S. PATENT DOCUMENTS

2004/0141682 A1* 7/2004 Mori ........................... 385/18
2004/0227984 A1* 11/2004 Yamabana et al. .......... 359/290
2005/0047711 A1 3/2005 Ide et al. ....................... 385/18

FOREIGN PATENT DOCUMENTS

| JP | 2003-15123 | 1/2003 |
| JP | 2005-99682 | 4/2005 |

* cited by examiner

*Primary Examiner*—Hemang Sanghavi
*Assistant Examiner*—Kajli Prince
(74) *Attorney, Agent, or Firm*—Hanify & King, P.C.

(57) ABSTRACT

An optical switch system has a plurality of micro mirrors arranged in a plane, and an angle of each of the micro mirrors can be controlled for reflecting an optical signal entered from one or more input ports so that the reflected optical signal enters a selected output port of one or more output ports. The optical switch system includes a storage portion for storing connection information between the input port and the output port, a correction quantity obtaining portion for obtaining a correction quantity for a cross talk generated between neighboring micro mirrors among the plurality of micro mirrors, a computing portion for determining a controlling quantity of the micro mirror in accordance with the connection information and the correction quantity, and a drive output portion for driving the micro mirror in accordance with the controlling quantity.

13 Claims, 12 Drawing Sheets

| A\B | B1 | B2 | B3 | B4 |
|---|---|---|---|---|
| A1 | | | | |
| A2 | | | | |
| A3 | | | | |
| A4 | | | | |

| LEFT CHANNEL | | | |
|---|---|---|---|
| FOR A | | FOR B | |
| B1 | | A1 | |
| B2 | | A2 | |
| B3 | | A3 | |
| B4 | | A4 | |

HR3L     HR3L (B)
CT4R (CT4)

| RIGHT CHANNEL | | | |
|---|---|---|---|
| FOR A | | FOR B | |
| B1 | | A1 | |
| B2 | | A2 | |
| B3 | | A3 | |
| B4 | | A4 | |

| KTEL(KTE) | | KTER(KTE) | |
|---|---|---|---|
| (N−1) CHANNEL | | (N+1) CHANNEL | |
| K1 | | K3 | |
| K2 | | K4 | |

OPTICAL SWITCH SYSTEM

BACKGROUND OF THE INVENTION

1. Field of the Invention

The present invention relates to an optical switch system that switches an optical signal entered from an input port by using micro mirrors such as MEMS (Micro Electro Mechanical Systems) mirrors so as to send out the optical signal to an output port. For example, the present invention is used for OXC (Optical Cross-Connect) system with a WDM (Wavelength Division Multiplexing) communication or a space division communication or the like.

2. Description of the Prior Art

Conventionally, there has been developed micro mirrors utilizing an MEMS technology called a DMD (Digital Micromirror Device), which is used for an optical switch system that is disposed at a node of an optical network. The optical switch system includes a plurality of micro mirrors arranged in a plane, and each of the mirrors has a reflection plane whose angle can be controlled. Optical signals entered from a plurality of input ports are reflected by the plurality of micro mirrors, and each of the reflected optical signals enters a selected output port among the plurality of output ports. In this way, ports are switched so that an optical exchange of a plurality of optical signals on an optical transmission channel can be performed.

Concerning a control of such micro mirrors in the optical switch system, following techniques are disclosed conventionally.

Japanese unexamined patent publication No. 2003-15123 discloses a liquid crystal display device of a reflection type, which is made up of a liquid crystal display panel of a transmission type and micro mirrors arranged at the rear side of the liquid crystal display panel. This device adjusts a luminance of transmitted light from the transmission liquid crystal display panel by a reflection angle of a micro mirror. More specifically, an angle of a micro mirror plane is altered with respect to the optical axis of irradiation light so as to adjust a luminance variation of transmitted light of each pixel in the LCD. In addition, a luminance level of transmitted light from each pixel in the LCD is corrected for each pixel, so that a flicker adjustment, a cross talk adjustment or a ghost adjustment is performed.

In addition, Japanese unexamined patent publication No. 2005-99682 discloses a technique of controlling an angular position of a micro mirror by a closed loop using a mirror angle sensor for detecting an angular position of the micro mirror.

An optical switch system performs an angular control of micro mirrors in which the micro mirror is controlled to be an appropriate angle so that light from an input port is sent to an output port. Inherently, a theoretical value of a control angle can be calculated from a geometric arrangement of the micro mirror, the input port and the output port. In reality, however, the control angle may be deviated from the theoretical value due to a structural variation of the micro mirror or an assembly error of an optical system lens or the like. Therefore, a control angle (i.e., a real measurement optimum point) or a VOA (Variable Optical Attenuator) angle (i.e., a real measurement VOA point) is measured, which produces a least loss even if the output port is connected to an optical monitoring device or the like.

On the other hand, the micro mirror has an advantage in that it can be downsized. For this reason, however, it has tendency to have an electrical cross talk between neighboring mirrors. This cross talk may affect the control angle of the micro mirror and cause an angle shift. If an angle shift is generated in the micro mirror, an optical coupling efficiency between the input port and the output port is decreased so that an insertion loss may increase.

However, it is difficult to reduce the influence of the cross talk between micro mirrors, so any adjustment or correction is not performed for that purpose.

Further, in the technique disclosed in the second document described above, the mirror angle sensor detects an angular position of the micro mirror, and the angular position of the micro mirror is controlled by the closed loop. Therefore, an influence of the cross talk is substantially reduced. However, mounting such a mirror angle sensor in each micro mirror may cause an increase of a mounting area and a cost, which is disadvantageous for a compact size and a low cost.

SUMMARY OF THE INVENTION

An object of the present invention is to provide an optical switch system having a low loss by performing a correction of an angle shift due to a cross talk between micro mirrors without increasing a mounting area.

An optical switch system according to one aspect of the present invention has a plurality of micro mirrors arranged in a plane, in which an angle of each of the micro mirrors can be controlled for reflecting an optical signal entered from one or more input ports so that the reflected optical signal enters a selected output port of one or more output ports. The optical switch system includes a storage portion for storing connection information between the input port and the output port, a correction quantity obtaining portion for obtaining a correction quantity for a cross talk generated between neighboring micro mirrors among the plurality of micro mirrors, a computing portion for determining a controlling quantity of the micro mirror in accordance with the connection information and the correction quantity, and a drive output portion for driving the micro mirror in accordance with the controlling quantity.

Preferably, a cross talk table is provided that stores a data of the correction quantity for the cross talk generated between neighboring micro mirrors, and the correction quantity obtaining portion obtains the correction quantity by reading a data out of the cross talk table in accordance with the connection information.

In addition, the correction quantity obtaining portion obtains the correction quantity for the micro mirror to be a target by performing a calculation using a control angle of a micro mirror neighboring to the micro mirror to be a target or a voltage value corresponding to the control angle.

In addition, the correction quantity obtaining portion obtains the correction quantity by performing a calculation of a sum of a secondary term and a primary term of the control angle or the voltage value.

Another optical switch system according to the present invention includes a storage portion for storing connection information between the input port and the output port, a control angle obtaining portion for obtaining a control angle of the micro mirror based on the connection information, a filter portion for performing a filtering process on the control angle so as to reduce a mechanical resonance of the micro mirror, a θV conversion portion for converting the control angle after the filtering process into a voltage value, a drive output portion for driving the micro mirror based on the voltage value, and a correction quantity obtaining portion for determining a correction quantity for a cross talk generated between neighboring micro mirrors among the plurality of micro mirrors. The correction quantity obtaining portion determines the correction quantity by calculating a sum of a secondary term and a primary term of a control angle of a micro mirror neighboring to the micro mirror to be a target or a voltage value corresponding to the control angle. The determined correction quantity is used for the control angle or the voltage value of the micro mirror to be a target so that a drive quantity of the micro mirror to be a target is corrected.

According to the present invention, the correction of an angle shift due to a cross talk of the micro mirror can be performed without increasing a mounting area, so that an optical switch system with a low loss can be provided.

According to the present invention, the correction of an angle shift due to a cross talk of the micro mirror can be performed with a simple structure and a low cost as much as possible.

According to the present invention, an excessive correction of the micro mirror can be controlled, so that an accuracy of the correction can be improved.

BRIEF DESCRIPTION OF THE DRAWINGS

FIG. 5 shows an initial value table.

FIGS. 8(A) and 8(B) show cross talk tables that are used in a third embodiment.

FIG. 11 shows a coefficient table.

DESCRIPTION OF THE PREFERRED EMBODIMENTS

The invention will now be described in detail with reference to the attached drawings.

First Embodiment

Figure 1:
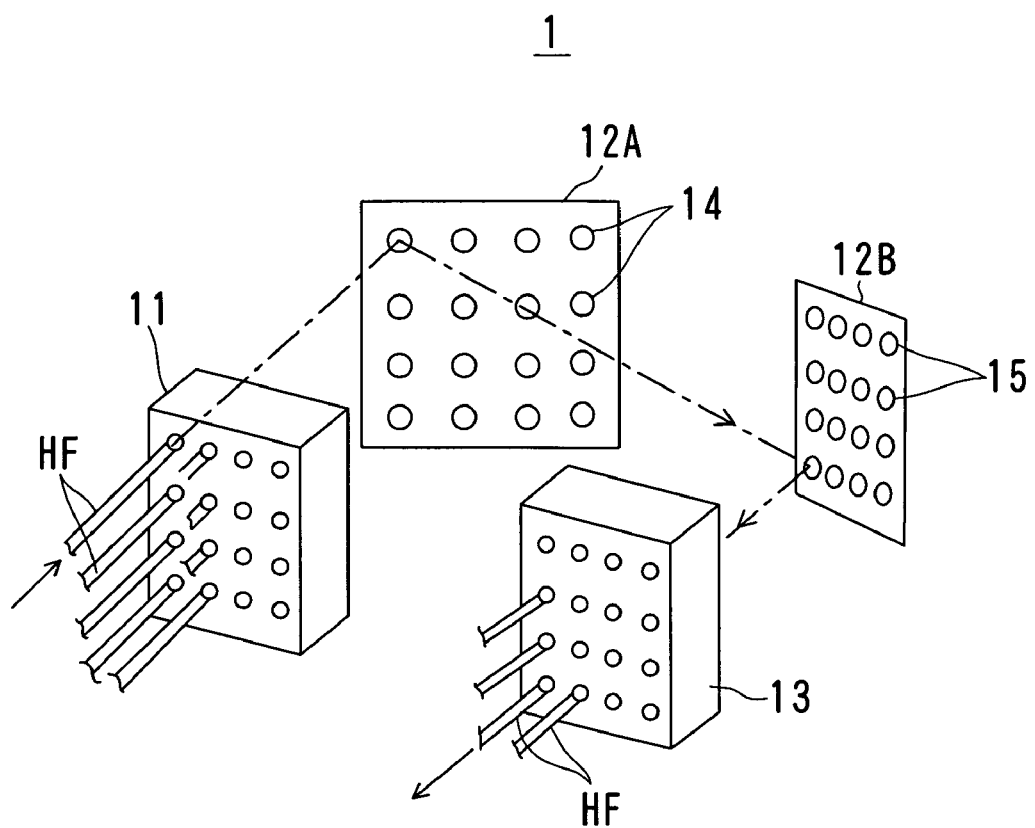
FIG. 1 is a diagram showing schematically an example of a mirror structure in an optical switch system according to an embodiment of the present invention.
Figure 2:
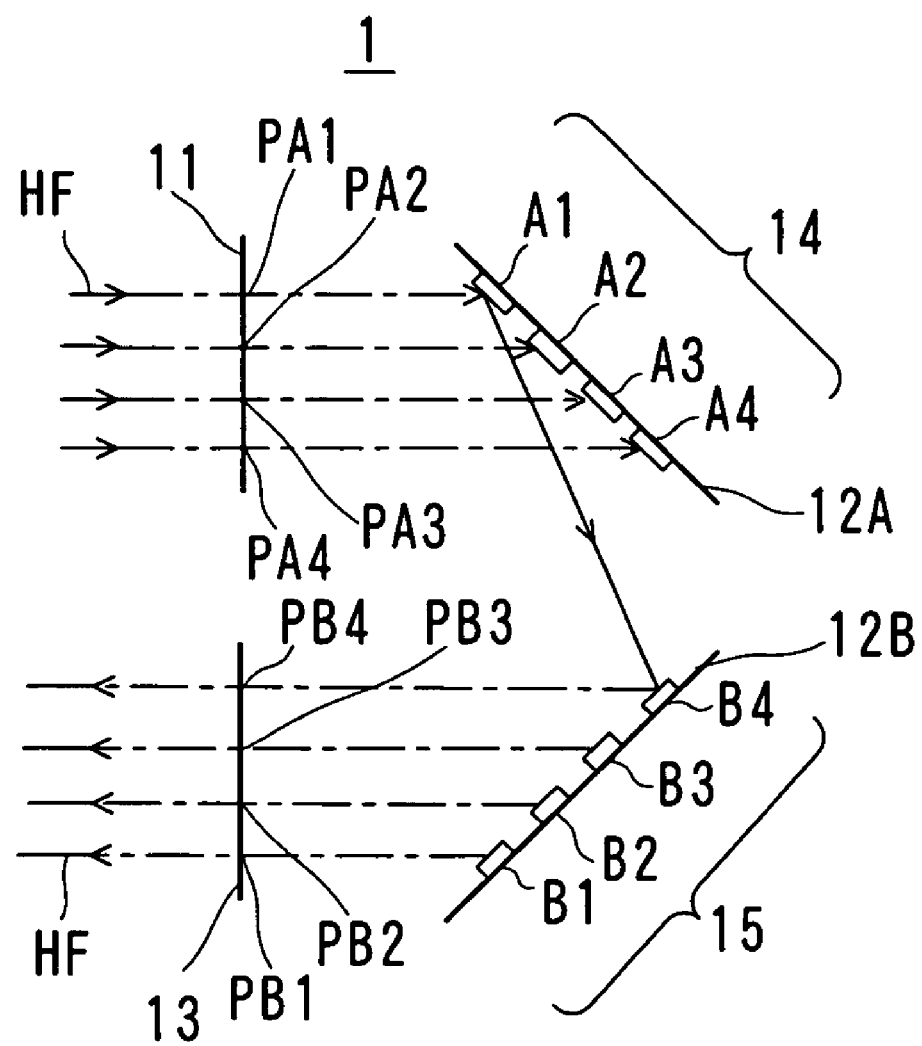
FIG. 2 is a diagram showing the optical switch system shown in FIG. 1 in a two-dimensional manner.
Figure 3:
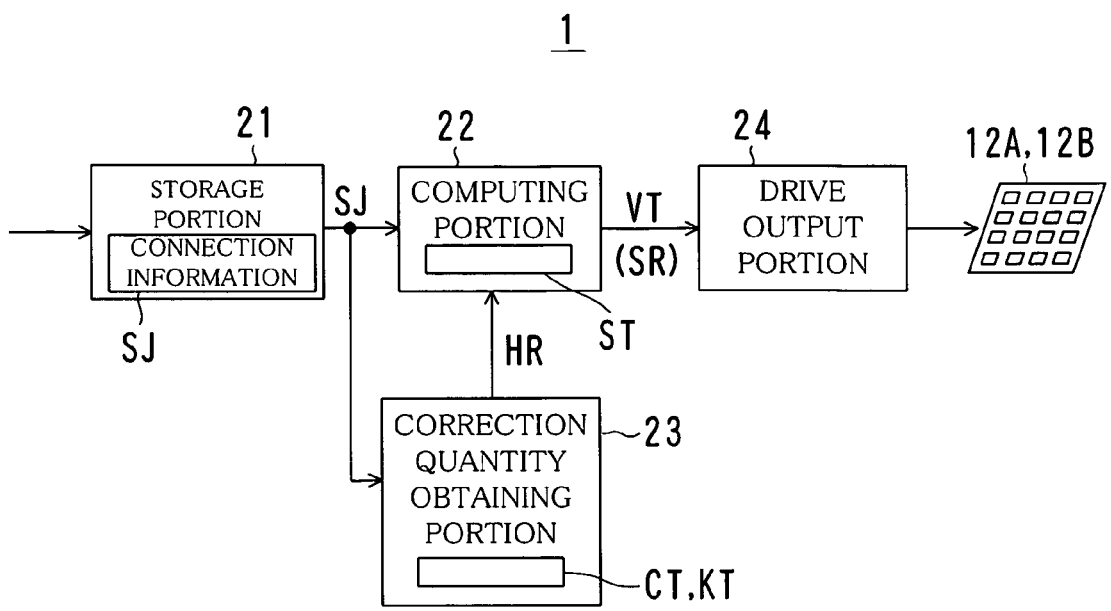
FIG. 3 is a block diagram showing a control function of the optical switch system according to a first embodiment.

FIG. 1 is a diagram showing schematically an example of a mirror structure in an optical switch system 1 according to an embodiment of the present invention, FIG. 2 is a diagram showing the optical switch system shown 1 in a two-dimensional manner, and FIG. 3 is a block diagram showing a control function of the optical switch system 1 according to a first embodiment.

As shown in FIG. 1, the optical switch system 1 is structured so that a plurality of optical signals are led through optical fibers HF and enter from the input port 11, and each traveling direction thereof is changed by the optical switches 12A and 12B, so as to output them from a predetermined output port 13.

In the optical switch system 1 shown in FIG. 1, each of the input port 11 and the output port 13 has 4×4 ports arranged like a matrix. Each of the optical switches 12A and 12B is made up of 4×4 micro mirrors 14, 14, . . . , 15, 15, . . . that are arranged like a matrix in the same way.

Light that enters one of the sixteen input ports 11 enters one of the optical switches 12A disposed on an optical axis thereof and is reflected by the same. In addition, light enters one of sixteen output ports 13 from one of optical switches 12B disposed on the optical axis. In other words, 4×4 input ports 11 arranged like a matrix, the optical switch 12A, the output port 13 and the optical switch 12B correspond to each other one for one. A correspondence between the optical switch 12A and the optical switch 12B determines the correspondence between the input port 11 and the output port 13.

Each of the micro mirrors 14 and 15 is a DMD (Digital Micro mirror Device) that is manufactured by an MEMS technology, for example. Each of the mirrors is supported by a parallel plate electrostatic actuator, and an angle of its reflection plane can be controlled. These micro mirrors 14 and 15 are known, and various structures can be adopted as the micro mirror in this embodiment.

As shown in FIG. 2, the input port 11 and the output port 13 have optical axes that are arranged in parallel with each other. The optical switches 12A and 12B are arranged with their postures inclined 45 degrees each toward the optical axis. When angles of the micro mirrors 14 and 15 are controlled, one of the input ports 11 is connected to one of the output ports 13 in an optical manner.

Note that FIG. 2 shows a model in which there are four input ports 11 and four output ports 13, four micro mirrors A1, A2, A3 and A4 are disposed as the optical switch 12A on the input side, and four micro mirrors B1, B2, B3 and B4 are disposed as the optical switch 12B on the output side.

According to this model, when angles of 4×2 micro mirrors A1-A4 and B1-B4 are controlled, four input ports PA1-PA4 and four output ports PB1-PB4 can be connected in every combination. Usually, the connection is performed so that an optical signal entering one input port 11 goes out from only one output port 13, or that an optical signal going out from one output port 13 enters only one input port 11. However, without limited to this connection, it is possible to connect so that the optical signal is transmitted from one input port 11 to a plurality of output ports 13 or from a plurality of input ports 11 to one output port 13.

Hereinafter, for simplifying the description, without any particular indication, an example will be described where 4×2 micro mirrors A1-A4 and B1-B4 are controlled as shown in FIG. 2. Note that any one or a whole of the micro mirrors A1-A4 is sometimes referred to as a "micro mirror A" or an "A side micro mirror" or the like. This is the same for the micro mirrors B1-B4. In addition, each of the A side and the B side micro mirrors has a number of 1-4, and this number may be referred to as a "channel". In this case, if a micro mirror to be a target is an N channel, micro mirrors on both side thereof are "N−1" channel and "N+1" channel. In addition, if the micro mirrors are arranged in a two-dimensional manner, micro mirrors around the micro mirror to be a target, i.e., micro mirrors on the upper, the lower, the right and the left sides thereof are neighboring micro mirrors. In this case, the number of channels of the neighboring micro mirrors is determined by an arrangement state of the micro mirror.

In FIG. 3, the optical switch system 1, particularly a control portion thereof includes a storage portion 21, a computing portion 22, a correction quantity obtaining portion 23 and a drive output portion 24.

The storage portion 21 stores connection information SJ between the input port 11 and the output port 13. More specifically, the storage portion 21 stores connection information SJ between the input ports PA1-PA4 and the output ports PB1-PB4. This connection information SJ is, for example, transmitted from a computer for managing the optical switch system 1 in accordance with a request at any time.

The computing portion 22 determines a controlling quantity SR of the micro mirrors A and B in accordance with the connection information SJ and a correction quantity HR obtained by the correction quantity obtaining portion 23. The controlling quantity SR is a voltage value VT that is applied to a control electrode of the micro mirror for driving the micro mirrors A and B at last. Therefore, it is possible to configure to perform a calculation directly based on the connection information SJ and the correction quantity HR so as to determine a corrected voltage value VT. In this case, a correction quantity corresponding to the voltage value VT is used as the correction quantity HR.

In addition, usually, in accordance with the connection information SJ, a control angle θ of the micro mirrors A and B is determined, and then the voltage value VT is determined from the control angle θ. Therefore, it is possible that a calculation is performed in accordance with the connection information SJ and the correction quantity HR so that the corrected control angle θ is determined as the controlling quantity SR, and after that the voltage value VT is determined from the control angle θ. In this case, a correction quantity corresponding to the control angle θ is used as the correction quantity HR.

Note that a relationship between the control angle θ and the voltage value VT is shown in the following equation (1).

$$\theta = \alpha \times (VT)^2 \qquad (1)$$

where, α is a unique constant determined by hardness or the like of each micro mirror.

In other words, the control angle θ of the micro mirror is proportional to a square of the voltage value VT for driving the micro mirror.

In addition, when the correction quantity obtaining portion 23 determines the controlling quantity SR, the control angle θ or the voltage value VT before correction may be determined, and the correction quantity HR may be added to the same so that the corrected control angle θ or the voltage value VT is determined. In this case, it is possible to store the control angle θ or the voltage value VT of each micro mirror corresponding to the connection information SJ as an initial value table ST, and to read a data from the initial value table ST in accordance with the connection information SJ so that the control angle θ or the voltage value VT before correction is obtained.

The control angle θ or the voltage value VT to be stored in the initial value table ST can be obtained by a real measurement. For example, micro mirrors except the micro mirror to be a target are turned off, i.e., set to the state with no applied voltage, and a voltage is applied only to the micro mirror to be a target so that a optimal control angle θ or voltage value VT is obtained by the real measurement.

In addition, in order to suppress or reduce a mechanical resonance of the micro mirrors A and B, a filtering process is performed on the control signal indicating the control angle θ. Therefore, it is possible to provide a filter portion in the computing portion 22 for performing the filtering process. In addition, it is possible to perform the calculation including the filtering process when the computing portion 22 calculates the control angle θ or the voltage value VT.

The correction quantity obtaining portion 23 obtains a correction quantity HR for the cross talk generated between neighboring micro mirrors in accordance with the connection information SJ. More specifically, the correction quantity obtaining portion 23 obtains the correction quantity HR for suppressing or reducing an influence of a cross talk from other neighboring micro mirrors for the micro mirror to be a target of the correction. In the example shown in FIG. 2, it is a correction quantity HR for correcting a cross talk from the micro mirror A2 for the micro mirror A1, while it is a correction quantity HR for correcting a cross talk from the micro mirrors A1 and A3 for the micro mirror A2.

In order to obtain the correction quantity HR, it is possible to provide a cross talk table CT storing a correction quantity in the correction quantity obtaining portion 23. More specifically, the cross talk table CT stores a correction quantity for a cross talk generated between neighboring micro mirrors, and the correction quantity HR is obtained by reading a data out of the cross talk table CT in accordance with the connection information SJ.

In this case, the cross talk table CT stores correction quantities HR for all the micro mirrors A and B, concerning each of the micro mirrors B and A to which each of the micro mirrors A and B corresponds, and concerning each of the micro mirrors B and A to which a micro mirror that is neighboring to each of the micro mirrors A and B corresponds.

In addition, it is possible to store a correction quantity HR that is used in common to a plurality of or all the micro mirrors A and B, instead of storing the correction quantity HR for all the micro mirrors A and B as the cross talk table CT. In this case, a correction quantity HR may be stored that corresponds to the right or the left micro mirror neighboring to the micro mirror that is used in common to a plurality of or all the micro mirrors A and B.

In addition, it is possible to configure so that the correction quantity obtaining portion 23 determines the correction quantity HR by calculation. In this case, it performs the calculation using a control angle θ of a micro mirror neighboring to the micro mirror to be a target or a voltage value VT corresponding to the control angle θ, so that the correction quantity HR for the micro mirror to be a target is obtained.

As contents of the calculation, a sum of a secondary term and a primary term is calculated for the control angle θ or the voltage value VT so that the correction quantity HR is obtained. Alternatively, only the secondary term is calculated for the control angle θ or the voltage value VT so that the correction quantity HR is obtained. Other than that, various calculations can be performed.

In the case of determining the correction quantity HR by a calculation, it is possible to provide a coefficient table KT storing coefficients that are used for the calculation and to perform the calculation by using a coefficient read out of the coefficient table KT. For example, the calculation may be performed by using a coefficient read out of the coefficient table KT as a coefficient of a secondary term or a primary term for the control angle θ or the voltage value VT.

In the case of determining the correction quantity HR by a calculation, it is desirable to determine the correction quantity HR by using the control angle θ or the voltage value VT after performing the filtering process in the computing portion 22, and to perform the correction by using the correction quantity HR for the control angle θ or the voltage value VT after performing the filtering process in the computing portion 22. Thus, an excessive correction is prevented so that an accuracy of the correction can be improved. Its detail reason will be described below.

Note that a cross talk in the micro mirror is caused mainly by an electrostatic force due to a voltage that is applied to a neighboring micro mirror. For example, it is supposed that the micro mirror to be a target is in a predetermined control state. If a voltage is applied or a value of the voltage is changed for controlling the neighboring micro mirror, it causes a change of the control angle θ of the micro mirror to be a target in a predetermined control state. The change of the control angle θ causes an angle shift so that the optical coupling efficiency is lowered. For this reason, a level of an optical signal that is transmitted to the output port is lowered, and an insertion loss due to the optical switch system 1 increases as a whole. In the optical switch system 1 according to this embodiment, the correction is performed for controlling the drop of the level of the optical signal due to the cross talk.

The drive output portion 24 drives the micro mirrors A and B based on the controlling quantity SR. The drive output portion 24 is an AD converter for converting the digital voltage value VT outputted from the computing portion 22 into an analogue output voltage V, for example. A drive quantity of each of the micro mirrors A and B is determined by the output voltage V from the drive output portion 24.

In the optical switch system 1 having a structure as described above, the correction of the cross talk can be performed by an open loop, so it is not necessary to provide a mirror angle sensor in each of the micro mirrors as the conventional structure. Therefore, the correction of the angle shift due to the cross talk of the micro mirror can be performed without increasing the mounting area, so that an optical switch system with a low loss can be provided.

Note that the storage portion 21, the computing portion 22 and the correction quantity obtaining portion 23 perform a process based on a digital signal, and the drive output portion 24 performs a conversion process of the digital signal into an analogue signal. The number of drive output portion 24 that must be provided physically corresponds to the number of micro mirrors A and B. However, the storage portion 21, the computing portion 22 and the correction quantity obtaining portion 23 can be physically only one each. In other words, one storage portion 21, one computing portion 22 and one correction quantity obtaining portion 23 can perform processes for all the micro mirrors A and B.

In addition, the filtering process in the computing portion 22 can be performed to calculate by using an optimal parameter for each of the micro mirrors A and B or by using the same parameter for all the micro mirrors A and B. The computing portion 22 and the correction quantity obtaining portion 23 can be structured by a special hardware circuit or by using a DSP or a CPU, or by combining them.

Second Embodiment

Next, more specific control function will be described for an optical switch system 1B according to a second embodiment.

Figure 4:
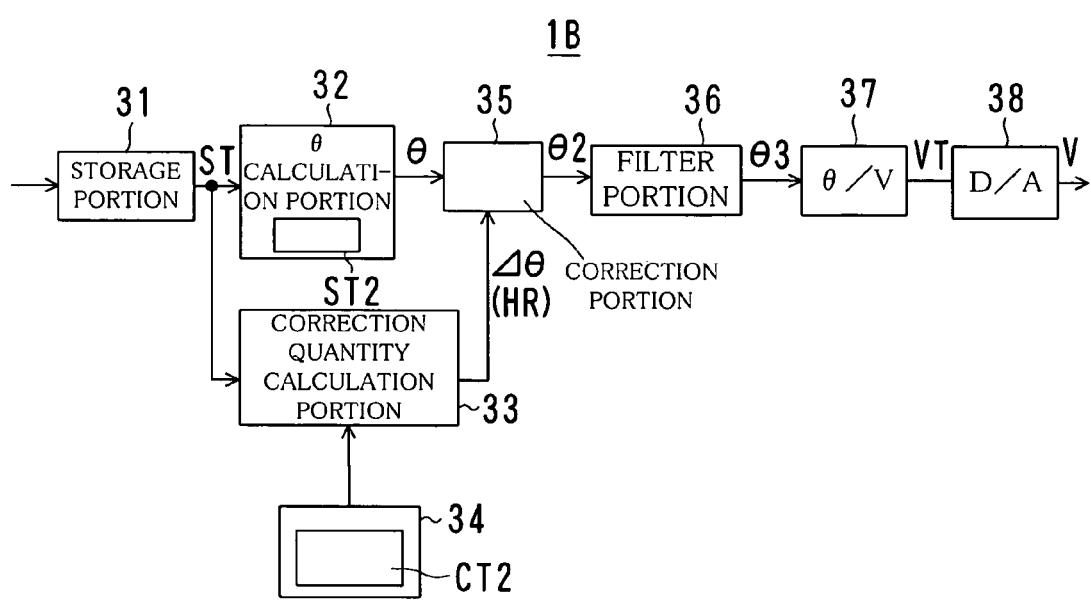
FIG. 4 is a block diagram showing a control function of an optical switch system according to a second embodiment.
Figure 5:
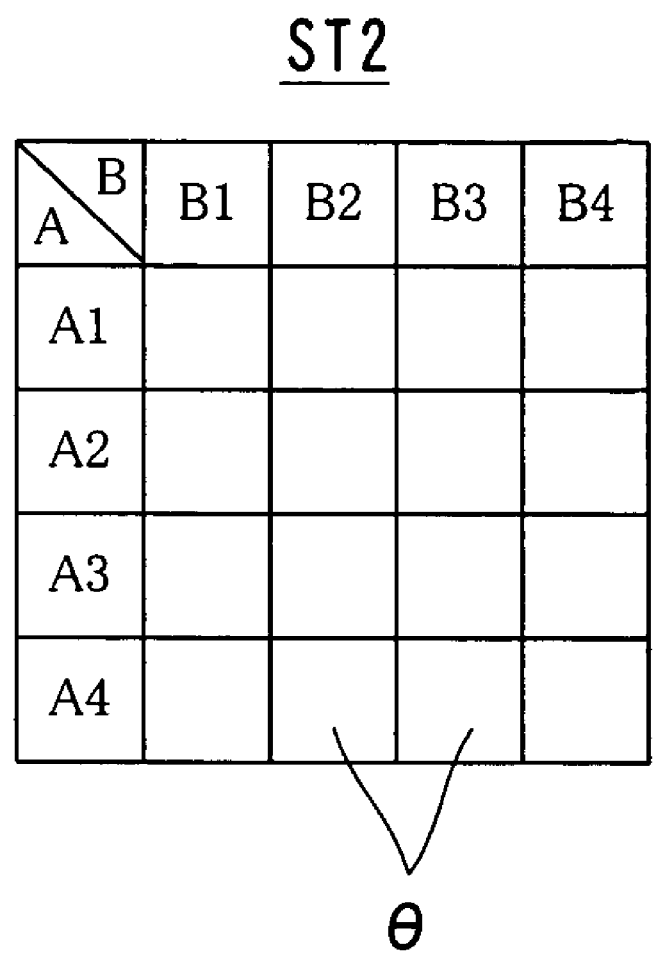
Figure 6:
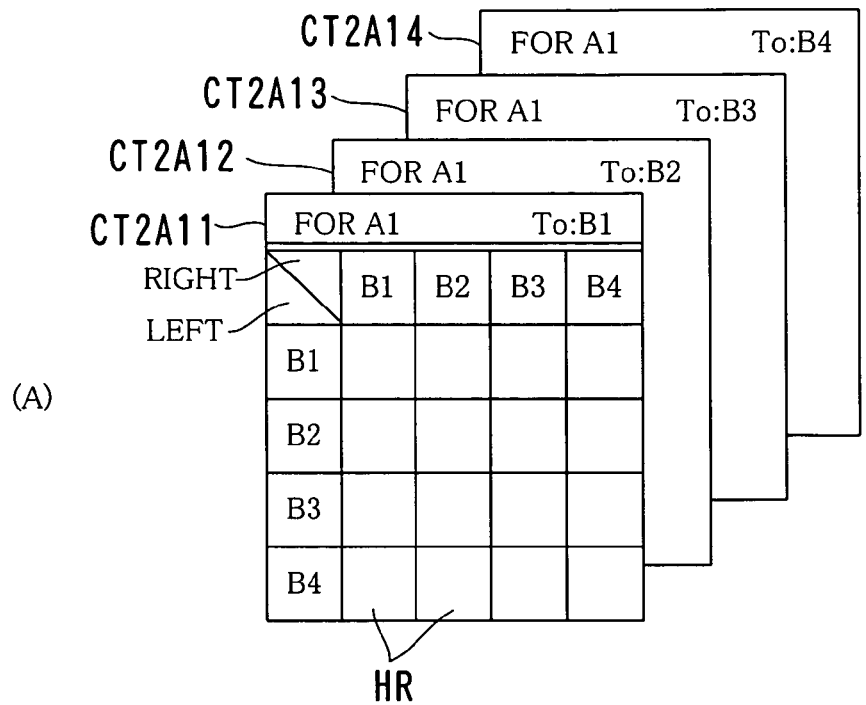
FIGS. 6(A) and 6(B) show cross talk tables.
Figure 6:
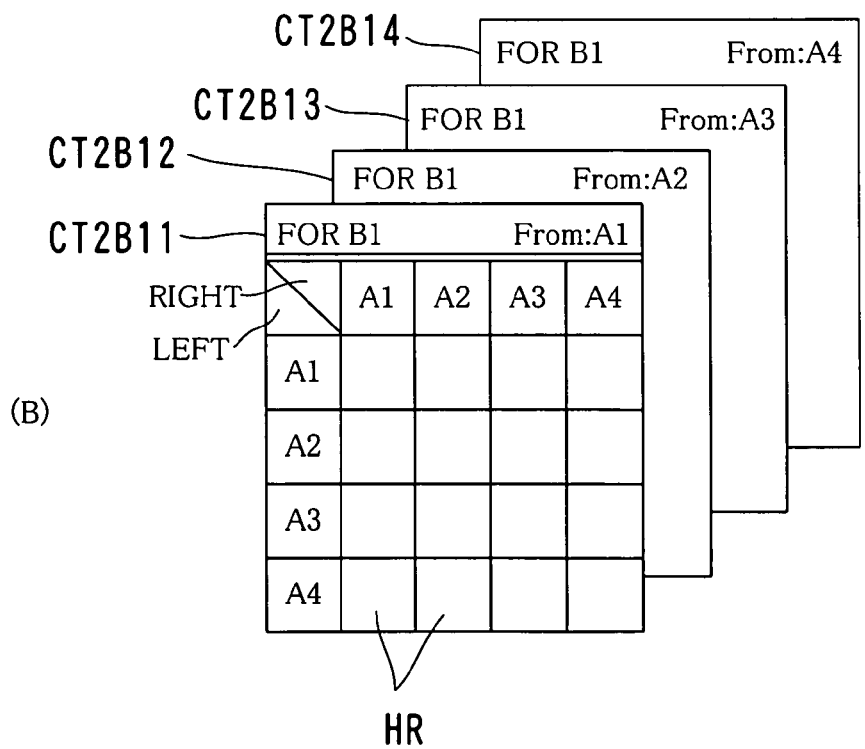
Figure 7:
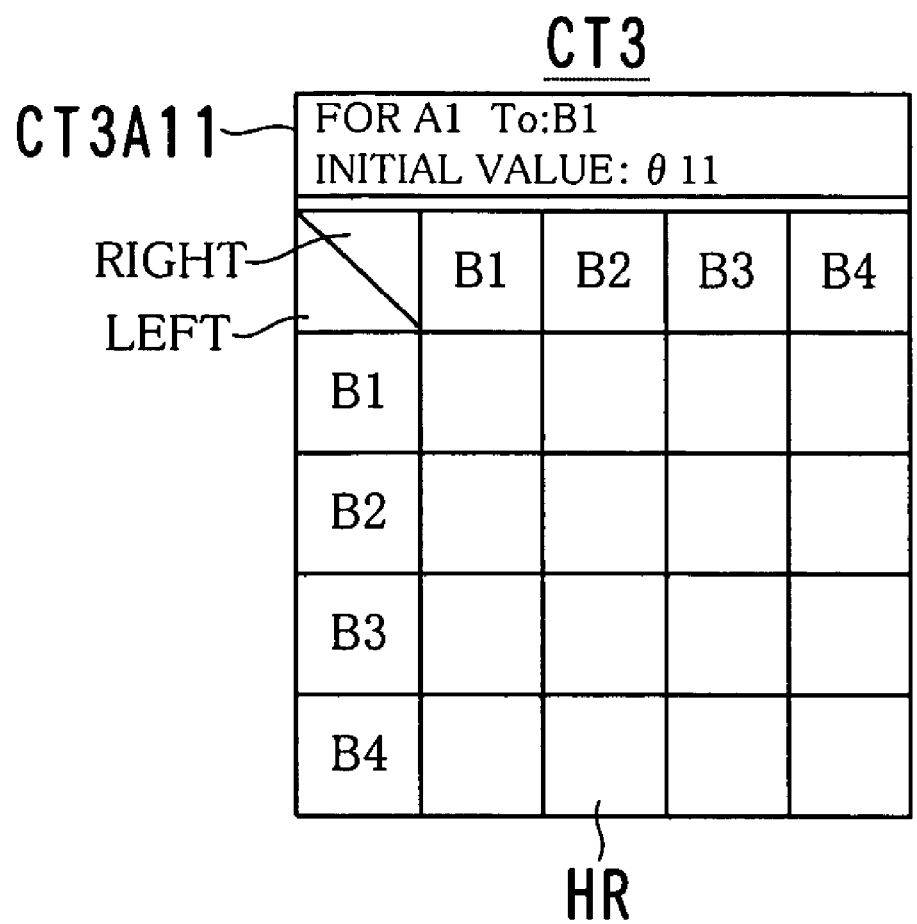
FIG. 7 shows a variation of the cross talk table.

FIG. 4 is a block diagram showing a control function of an optical switch system 1B according to the second embodiment, FIG. 5 shows an initial value table ST2, FIGS. 6(A) and 6(B) show cross talk tables CT2A and CT2B, and FIG. 7 shows a variation of the cross talk table CT3.

Note that explanations described above for the first embodiment can be basically adopted for the second embodiment, too. Therefore, only a structure of the second embodiment added to the first embodiment or a difference between them will be described, and others will be omitted or simplified.

In FIG. 4, the optical switch system 1B includes a storage portion 31, a control angle calculation portion 32, a correction quantity calculation portion 33, a cross talk table storing portion 34, a correction portion 35, a filter portion 36, a θV conversion portion 37 and a DA converter 38.

The storage portion 31 stores the connection information SJ similarly to the storage portion 21. As the storage portion 31, a DPRAM (Dual Port Random Access Memory) or other semiconductor memory is used, for example.

The control angle calculation portion 32 calculates or creates the angles θ of the micro mirrors A and B in accordance with the connection information SJ. In order to calculate the control angles θ, the initial value table ST2 is provided as shown in FIG. 5

In FIG. 5, the initial value table ST2 stores control angles θ that should be adopted to a micro mirror A on the input side and a micro mirror B on the output side for every combination of the micro mirrors A1-A4 on the input side and the micro mirrors B1-B4 on the output side shown in FIG. 2. Therefore, the initial value table ST2 stores 4×4×2 data of control angles θ. However, if the same control angle θ can be used for a micro mirror A and a micro mirror B that are positioned symmetrically to each other, the number of data can be reduced to a half, for example.

The control angle calculation portion 32 reads out corresponding data of the micro mirrors A and B from the initial value table ST2 in accordance with the connection information SJ, and set the data as the control angles θ.

The correction quantity calculation portion 33 determines the correction quantity HR for a cross talk generated between neighboring micro mirrors among the plurality of micro mirrors A and B in accordance with the connection information SJ.

The cross talk table storing portion 34 stores a cross talk table CT2, and the correction quantity calculation portion 33 determines the correction quantity HR from a data read out of the cross talk table CT2.

The cross talk table CT2 shown in FIG. 6 stores the correction quantity HR for all the micro mirrors A and B, for each of the micro mirrors B and A to which each of the micro mirrors A and B corresponds, and for each of the micro mirrors B and A to which a micro mirror neighboring each of the micro mirrors A and B corresponds. The correction quantity HR is a correction quantity corresponding to the cross talk for the control angle θ.

More specifically, in the cross talk table CT2A shown in FIG. 6(A), the table CT2A11 stores each correction quantity HR for the micro mirror A1, for the case where the micro mirror A1 corresponds to the micro mirror B1, for each of the micro mirrors B1-B4 to which the micro mirror on the right side and the left side neighboring to the micro mirror A1 corresponds. The tables CT2A12-CT2A14 store the correction quantities HR for the micro mirror A1, for the case where the micro mirror A1 corresponds to the micro mirrors B2-B4, for each of the micro mirrors B1-B4 to which the micro mirror on the right side and the left side neighboring to the micro mirror A1.

Although FIG. 6(A) shows only about the micro mirror A1, the cross talk table CT2A also stores the correction quantity HR for the micro mirrors A2-A4 in the same way.

Similarly, in the cross talk table CT2B shown in FIG. 6(B), the table CT2B11 stores the correction quantity HR for the micro mirror B1, for the case where the micro mirror B1 corresponds to the micro mirror A1, for each of the micro mirrors A1-A4 to which the micro mirror on the right side and the left side neighboring to the micro mirror B1. The tables CT2B12-CT2B14 stores the correction quantity HR for the micro mirror B1, for the case where the micro mirror B1 corresponds to the micro mirrors A2-A4, for each of the micro mirrors A1-A4 to which the micro mirror on the right side and the left side neighboring to the micro mirror B1 corresponds.

Then, the cross talk table CT2B shown in FIG. 6(B) stores the correction quantity HR for the micro mirrors B2-B4 in the same way.

Therefore, each of the cross talk tables CT2A and CT2B for A and for B stores data of the correction quantities HR of the number of power of the number of ports at most. In this example, 4×4×4×4 data of correction quantities HR are stored. Therefore, the entire of the cross talk table CT stores data of 4×4×4×4×2.

However, if the input port 11 and the output port 13 correspond to each other only by one for one, the number of combination of the micro mirror A and the micro mirror B deceases. Therefore, the number of the correction quantities HR is also reduced.

Note that each of the correction quantities HR to be stored in the cross talk table CT2 can be obtained by a real measurement of influence due to the cross talk. For example, in order to obtain the correction quantities HR for the micro mirror to be a target A, other micro mirror is set to the OFF state, and a micro mirror on the left side of the micro mirror A or a micro mirror on the right side of the same is switched in turn so that an optical signal is directed to each of the four micro mirrors B. Then, data indicating influences in each of the state or data for canceling the influence are measured actually. According to these data, the correction quantities HR are determined.

As described above, if the correction quantities HR are stored in the cross talk table CT2, one correction quantity HR is read out in accordance with the connection information SJ for obtaining correction quantities HR of one micro mirror. The read correction quantity HR is used as it is for a data of the correction quantity HR.

The correction portion 35 adds the control angle $\theta$ outputted from the control angle calculation portion 32 to the correction quantity HR outputted from the correction quantity calculation portion 33, so as to output the corrected control angle $\theta2$.

The filter portion 36 performs a filtering process for removing or reducing a mechanical resonance of the micro mirrors A and B. More specifically, a signal of the control angle $\theta2$ outputted from the correction portion 35 can usually be regarded as a step input that rises instantly to a constant value at a timing t=0. Therefore, if a voltage having the same waveform as the signal is applied to the micro mirror, an overshoot or a vibration may be generated by a mechanical inertia or the like of the micro mirror, which takes a time until being stabilized. Therefore, corresponding to a mechanical characteristic of each micro mirror, a filter portion 36 having an appropriate transfer function is provided so that the stable state can be obtained in a short time without the vibration or the like. The filter portion 36 is usually made up of a low pass filter having an appropriate cutoff frequency and phase characteristics. The control angle $\theta2$ becomes a control angle $\theta3$ after passing through the filter portion 36.

In this embodiment, the filter is a digital filter performed by a DSP or the like, and parameters that determine its characteristics are set to be adapted to the characteristics of each micro mirror, so that the operation of each micro mirror is optimized. However, it is possible to use one type of parameter for every micro mirror in common.

The $\theta V$ conversion portion 37 converts the control angle $\theta3$ into a voltage value VT by using the relationship defined by the above equation (1).

The DA converter 38 converts the digital voltage value VT outputted from the $\theta V$ conversion portion 37 into an analogue output voltage V.

In the optical switch system 1B having the structure described above, a data of an individual correction quantity for a cross talk corresponding to each micro mirror is measured in real and is stored in the cross talk table CT2, so that the data is read out for performing the correction of the control angle $\theta$. Therefore, the cross talk can be corrected with a high accuracy, so that a control in an optimal angle can be performed without a shift of the control angle $\theta$.

Since a cross talk is generated by a voltage that is applied to a neighboring micro mirror, it is possible to ignore an influence of the cross talk if the voltage is small. Therefore, it is possible to omit a data in the cross talk table CT2 described above without having the data of the correction quantity HR, if the control angle $\theta$ is small and so the voltage value VT is small. In this way, by omitting a data of a combination of a small voltage among the connection information SJ, time and effort for measuring the correction quantity HR in real can be reduced, and a quantity of data to be stored in the storage portion 31 can be reduced.

It is possible to store the initial value $\theta$ of the micro mirror in the table corresponding to each of the micro mirror in the cross talk table CT2.

More specifically, as shown in FIG. 7, a table CT3A11 that is a part of the cross talk table CT3 stores correction quantities HR for the micro mirror A1, for the case where the micro mirror A1 corresponds to the micro mirror B1, for each of the micro mirrors corresponding to micro mirrors on both sides. In addition, a control angle of the micro mirror A1 for directing the optical signal toward the micro mirror B is stored as an initial value $\theta11$.

In this way, a cross talk table CT3 in which the initial value table ST2 and the cross talk table CT2 are combined is created so that the initial value table ST2 stored in the control angle calculation portion 32 can be omitted.

However, in the cross talk tables CT2 and CT3 described above, the number of correction quantities HR to be stored, i.e., a quantity of data increases. Therefore, time is necessary for obtaining data, and a large capacity of storage for the cross talk tables CT2 and CT3 is also required. Next, an example of reducing a quantity of data to be stored will be described as an optical switch system 1C according to a third embodiment.

Third Embodiment

A third embodiment is different from the second embodiment only about a cross talk table CT4 stored in the cross talk table storing portion 34, and others are the same. Therefore, only the cross talk table CT4 will be described.

FIGS. 8(A) and 8(B) show cross talk tables CT4 that are used in a third embodiment.

In FIG. 8, the cross talk table CT4 is used commonly for all the micro mirrors. The cross talk table CT4 includes a cross talk table CT4L [FIG. 8(A)] storing a correction quantity HR3L for correcting an influence of a micro mirror on the left side (left channel) of one micro mirror to be corrected, and a cross talk table CT4R [FIG. 8(B)] storing a correction quantity HR3R for correcting an influence of a micro mirror on the right side (right channel) of the same.

For example, the cross talk table CT4L shown in FIG. 8(A) stores four correction quantities HR3L that is used in the case where the micro mirror to be corrected is on the A side and four correction quantities HR3L that is used in the case where the micro mirror to be corrected is on the B side. It is the same for the cross talk table CT4R shown in FIG. 8(B).

Therefore, concerning the micro mirror A2 to be corrected, for example, the correction quantity HR3L stored at the position corresponding to the micro mirror B to which the left micro mirror A1 is directed and the correction quantity HR3R stored at the position corresponding to the micro mirror B to which the right micro mirror A3 is directed are read out, and a sum of them is calculated for obtaining the correction quantity HR.

In this way, the cross talk table CT4 stores a data of the correction quantity HR that is used in common to all the micro mirrors, so that a quantity of data of the cross talk table CT4 can be reduced substantially.

For example, data of 4×2×2 correction quantities are stored in the cross talk table CT4. In this case, if the same data is used for A and B in the cross talk tables CT4L and CT4R, they are set as a common data so that a quantity of data can be further reduced to a half, i.e., 4×2 finally.

Note that it is possible that the cross talk table is not common to all the micro mirrors but is common to a plurality of micro mirrors, partially. For example, it is possible to provide a cross talk table that is used for the A side micro mirrors and a cross talk table that is used for the B side micro mirrors.

In the second and the third embodiments described above, the correction quantity HR is obtained by reading out of the cross talk table CT. Next, an example in which the correction quantity HR is obtained by calculation will be described as a fourth embodiment.

Fourth Embodiment

Figure 9:
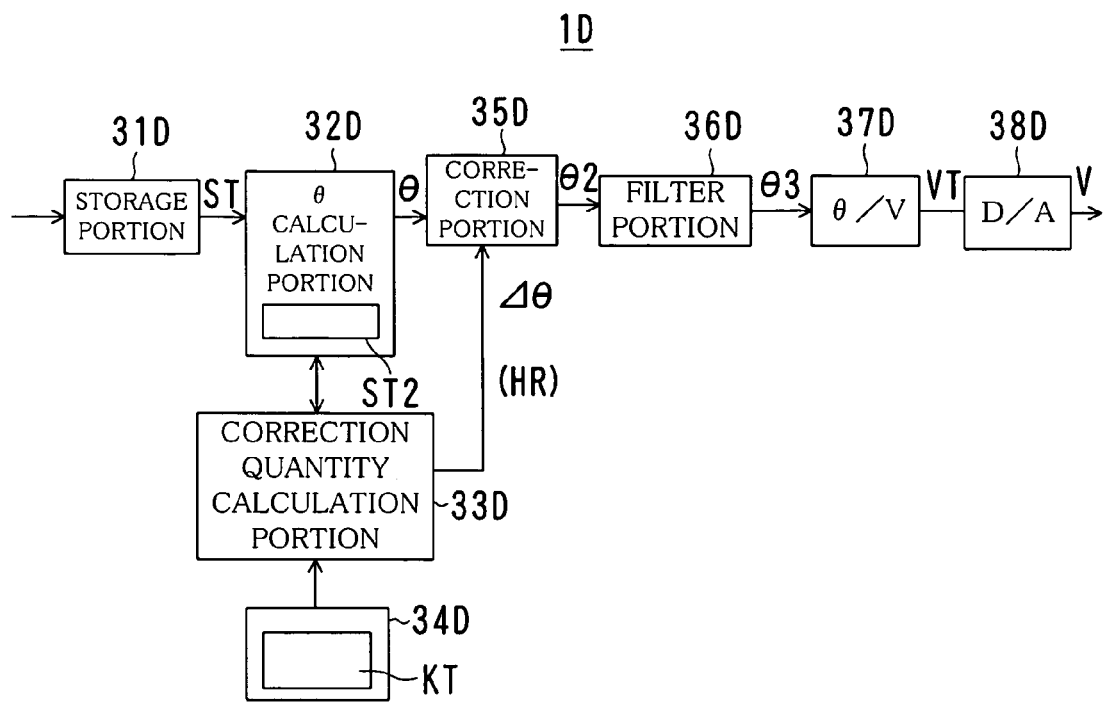
FIG. 9 is a block diagram showing a control function of an optical switch system according to a fourth embodiment.

FIG. 9 is a block diagram showing a control function of an optical switch system 1D according to a fourth embodiment of the present invention.

The optical switch system 1D shown in FIG. 9 is different from the optical switch system 1B shown in FIG. 4 in only a correction quantity calculation portion 33D, a coefficient table storing portion 34D and a coefficient table KT. Since other portions are the same as in the FIG. 4, only the different portions will be described.

In FIG. 9, the correction quantity calculation portion 33D calculates the correction quantity HR of the control angle θ in accordance with the coefficient table KT stored in the coefficient table storing portion 34D. For the calculation, various equations can be used. For example, the equation indicates a sum with weight of a secondary term and a primary term of the control angle θ that is applied to micro mirrors neighboring to the right and the left. The control angle θ that is used for the calculation can be the control angle θ calculated by the control angle calculation portion 32D. The weight can be a coefficient stored in the coefficient table KT. The detail of the equation will be described in a fifth embodiment below.

The coefficient table KT stores one or more coefficients that are used for calculating the correction quantity HR. For example, a plurality of coefficients to be used for micro mirrors on the right side and the left side of the micro mirror to be a target. The correction quantity calculation portion 33D uses a coefficient read out of the coefficient table KT so as to calculate the correction quantity HR for canceling influences of the right and the left micro mirrors. The calculation is performed at a predetermined short time interval based on a timing clock, for example. The correction quantity HR is calculated for performing the correction every time.

In this way, the coefficient is used for calculating the correction quantity HR, so that a capacity of storage for storing the correction quantity HR or the coefficient can be reduced.

Although the control angle θ is corrected in the second through the fourth embodiment described above, it is possible to correct the voltage value VT. Next, an example of correcting the voltage value VT will be described as a fifth embodiment.

Fifth Embodiment

Figure 10:
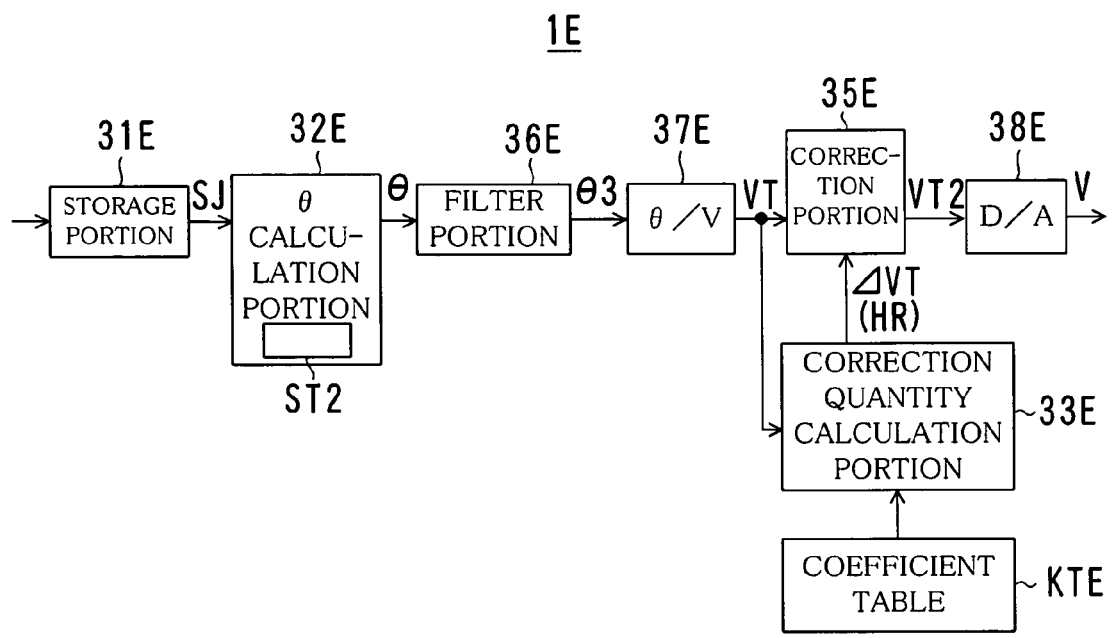
FIG. 10 is a block diagram showing a control function of an optical switch system according to a fifth embodiment.
Figure 12:
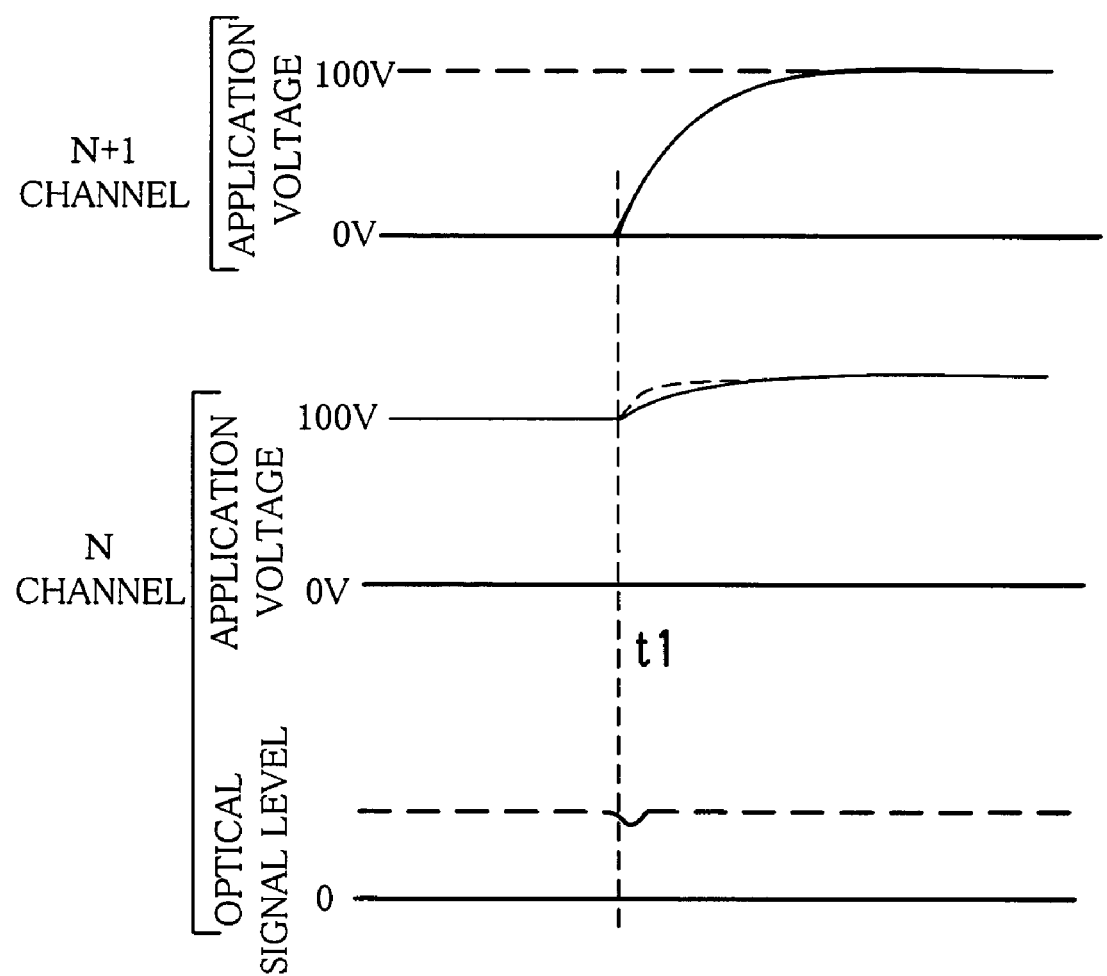
FIG. 12 is a chart for explaining an example of an excessive correction.

FIG. 10 is a block diagram showing a control function of an optical switch system 1E according to a fifth embodiment, FIG. 11 shows a coefficient table KTE, and FIG. 12 is a chart for explaining an example of an excessive correction.

In FIG. 10, the optical switch system 1E includes a storage portion 31E, a control angle calculation portion 32E, a filter portion 36E, a θV conversion portion 37E, a correction quantity calculation portion 33E, a correction portion 35E, a DA converter 38E, and a coefficient table KTE.

In the fifth embodiment, elements except for the correction quantity calculation portion 33E, the correction portion 35E and the coefficient table KTE have the same function as in the optical switch system 1B of the second embodiment, so the description of the elements having the same function will be omitted or simplified. In addition, the portions have similar functions as in the fourth embodiment, so differences and added points will be described mainly.

The correction quantity calculation portion 33E calculates the correction quantity HR of the voltage value VT in accordance with the coefficient table KTE. For the calculation, various equations can be used. For example, the following equation (2) can be used.

$$\Delta VT(N) = K1 \times [VT(N-1)]^2 + K2 \times [VT(N-1)] + K3 \times [VT(N+1)]^2 + K4 \times [VT(N+1)] \qquad (2)$$

Here, N represents a channel of the micro mirror to be a target, and ΔVT(N) represents its correction quantity HR. In addition, VT(N−1) and VT(N+1) represent voltage values VT that are applied to micro mirrors of the N−1 channel and the N+1 channel, respectively. K1-K4 are coefficients.

According to the equation (2), the correction quantity HR is expressed by a weight sum of the secondary term and the primary term of the voltage value VT that is applied to micro mirrors neighboring to the right and the left. As the voltage value VT that is used for the calculation, a voltage value VT to be applied to each micro mirror outputted from the θV conversion portion 37E is used. More specifically, the voltage value VT filtered by the filter portion 36E is used for the calculation by the equation (2). In addition, the weights that are used in the equation (2) are coefficients K1-K4 described above.

As shown in FIG. 11, the coefficient table KTE is made up of the coefficient table KTEL for the (N−1) channel and the coefficient table KTER for the (N+1) channel. The coefficient table KTEL stores two coefficients K1 and K2, and the coefficient table KTER stores two coefficients K3 and K4.

It is possible to perform modeling of the calculation of the correction quantity HR for canceling the influence of the cross talk as described in the above equation (2). The model expressed in the equation (2) is founded by the inventors of the present invention in an experiment of canceling the influence of cross talk and a statistical analysis thereof.

Therefore, values of the coefficients K1-K4 to be stored in the coefficient table KTE can be determined experimentally. For example, values of coefficients K1-K4 can be determined so that correction of the cross talk for all micro mirrors can be optimized.

Note that the calculation of the correction quantity HR is performed at a predetermined short time interval in synchronization with a timing clock or the like, and the calculation of the correction quantity HR and the correction based on the same are performed every time.

In addition, it is possible to use the following equation (3) instead of the above equation (2) for the calculation of the correction quantity HR.

$$\Delta VT(N) = K1[VT(N-1)/VT(N)]^2 + \\ K2[VT(N-1)/VT(N)] + K3[VT(N+1)/ \\ VT(N)]^2 + K4[VT(N+1)/VT(N)]$$ (3)

Here, the coefficients K1-K4 are different from those for the equation (2) described above.

According to the equation (3), the correction quantity HR is expressed by a weight sum of the secondary term and the primary term of a ratio of the voltage value VT that is applied to micro mirrors neighboring to the right and the left and the voltage value VT that is applied to the micro mirror to be a target.

In addition, it is possible to use the following equation (4) instead of the above equation (2).

$$\Delta VT(N) = K1[VT(N-1) - VT(N)]^2 + K21[VT(N-1) - \\ VT(N)]1 + K3[VT(N+1) - VT(N)]^2 + \\ K41[VT(N+1) - VT(N)]1$$ (4)

According to the equation (4), the correction quantity HR is expressed by a weight sum of the secondary term and the primary term of an absolute value of a difference between the voltage value VT that is applied to micro mirrors neighboring to the right and the left and the voltage value VT that is applied to the micro mirror to be a target.

In this way, the correction quantity HR for canceling an influence of cross talk is a function of the voltage value VT that is applied to a micro mirror neighboring to the micro mirror to be a target, which can be expressed by a weight sum of the secondary term and the primary term in a term including the voltage value VT. In addition, since the voltage value VT that is applied to the micro mirror and the control angle θ have the relationship expressed in the equation (1), it is possible to convert the term of the voltage value VT into the term of the control angle θ in these equations (2)-(4), and to calculate the correction quantity HR of the control angle θ in the same manner. The example of calculating the correction quantity HR of the control angle θ in this manner is the fourth embodiment described above. Therefore, as the equation for the calculation in the fourth embodiment, the equation (2)-(4) can be modified to a form for determining Δθ(N) that is a correction quantity HR of the control angle θ and be used.

Further, in the fifth embodiment, unlike the second through the fourth embodiments in which the control angle θ is used for the correction, the voltage value VT that is filtered by the filter portion 36E is used for the correction. Therefore, a correction error due to mechanical characteristics of the micro mirror can be suppressed so that the correction can be performed with a high accuracy.

More specifically, it is supposed that in the state where a voltage of 100 volts is applied to the N channel micro mirror to be an object as shown in FIG. 12, a voltage applied to the neighboring (N+1) channel micro mirror is raised from 0 to 100 volts at the time point t=1. It is supposed that when (N+1) channel micro mirror is raised, 5 volts is added as the correction quantity HR to the voltage value VT of the N channel micro mirror. Then, the addition of 5 volts should not be an instant one like a step but should be a smoothly curved one along the rising characteristics of the voltage of the (N+1) channel micro mirror as shown in FIG. 12 by a solid line. It is because if a step-like voltage is applied, the correction will be performed for a voltage value that is not applied yet in real to the (N+1) channel micro mirror. Therefore, an excessive correction is performed so that the N channel micro mirror will deviate in a transient manner from the correct control angle θ.

Therefore, in the fifth embodiment, the voltage value VT that is filtered by the filter portion 36E and is applied actually to the micro mirror is used for calculating the correction quantity HR. Therefore, the correction quantity HR of the (N+1) channel corresponding to the actual voltage rising along a smooth curve as shown in FIG. 12 is calculated. Thus, the correction quantity HR that is always correct is calculated, so that the correction is performed with a high accuracy.

If the control angle θ calculated by the control angle calculation portion 32E is used for calculating the correction quantity HR, Δθ(N) that is the correction quantity HR is added to the control angle θ of the N channel micro mirror like a step at the time point t=1. Although this added value Δθ(N) is filtered tentatively when it passes the filter portion 36E, it rises faster than the real voltage applied to the (N+1) channel micro mirror as shown in FIG. 12 by a broken line. As a result, an excessive correction may be performed. This excessive correction may cause a transitory drop of a level of the optical signal obtained via the N channel micro mirror as shown in FIG. 12 by the broken line, too.

As described above, according to the optical switch systems 1 and 1B-1E of the present embodiments, the correction of the angle shift due to a cross talk of the micro mirror can be performed without increasing a mounting area, and an optical switch system with a low loss can be realized. In addition, according to the optical switch systems 1B-1E of the third through the fifth embodiments, the correction of the angle shift due to a cross talk of the micro mirror can be performed with a simple structure and a low cost as much as possible. According to the optical switch system 1E of the fifth embodiment, an excessive correction of the micro mirror can be controlled so that accuracy of the correction can be improved.

Although the micro mirrors A and B are arranged in a one-dimensional manner in each embodiment described above, the present invention can be applied to the case where the micro mirrors are arranged in a two-dimensional or three-dimensional manner.

In each embodiment described above, the structure and the shape of the optical switches 12A and 12B, the arrangement and the number of micro mirrors and the like can be modified variously without limited to the above examples. The structure and the format of the cross talk table CT and the coefficient table KT, the arrangement of the data, the format of the data and the unit of the data and the like can be modified variously without limited to the above examples. Other than that, the structure, the configuration, the shape, the number, the material of a whole or a part of the input port 11, the output port 13, the computing portion 22, the correction quantity obtaining portion 23, the correction quantity calculation portion 33, the correction portion 35 and the optical switch systems 1 and 1B-1E, the contents of the process, the order of the process and the like can be modified if necessary in accordance with the spirit of the present invention.

The optical switch system of the present invention can be used as an optical switch system of various types such as a wavelength division multiple optical switch system or a space division communication optical switch system.

Although embodiments of the present invention are described with reference to several examples, the present invention can be embodied variously without limited to the above embodiments.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An optical switch system having a plurality of micro mirrors arranged in a plane, in which an angle of each of the micro mirrors can be controlled for reflecting an optical signal entered from one or more input ports so that the reflected optical signal enters a selected output port of one or more output ports, the optical switch system comprising:
    a storage portion for storing connection information between the input port and the output port;
    a correction quantity obtaining portion for obtaining a correction quantity for a cross talk generated due to a voltage that is applied to a neighboring micro mirror among the plurality of micro mirrors;
    a computing portion for determining a controlling quantity of the micro mirror in accordance with the connection information and the correction quantity; and
    a drive output portion for driving the micro mirror in accordance with the controlling quantity.

2. The optical switch system according to claim 1, wherein a cross talk table is provided that stores a data of the correction quantity for the cross talk generated between neighboring micro mirrors, and
    the correction quantity obtaining portion obtains the correction quantity by reading a data out of the cross talk table in accordance with the connection information.

3. The optical switch system according to claim 2, wherein the cross talk table stores the correction quantity of each micro mirror for each direction in which each micro mirror is to be directed and for each direction in which each of neighboring micro mirrors is to be directed, and
    the computing portion determines the controlling quantity of the micro mirror to be a target by using the correction quantity corresponding to each direction in which the micro mirror or its neighboring micro mirror is to be directed.

4. The optical switch system according to claim 2, wherein the cross talk table stores the correction quantity corresponding to a direction in which a neighboring micro mirror is to be directed, and
    the computing portion determines the controlling quantity of the micro mirror to be a target by using the correction quantity read out of the cross talk table for the plurality of micro mirrors to be targets.

5. The optical switch system according to claim 1, wherein the correction quantity obtaining portion obtains the correction quantity for the micro mirror to be a target by performing a calculation using a control angle of a micro mirror neighboring to the micro mirror to be a target or a voltage value corresponding to the control angle.

6. The optical switch system according to claim 5, wherein the correction quantity obtaining portion obtains the correction quantity by performing a calculation of a sum of a secondary term and a primary term of the control angle or the voltage value.

7. The optical switch system according to claim 6, further comprising a coefficient table for storing coefficients that are used for calculating the correction quantity, wherein the correction quantity obtaining portion uses the coefficients read out of the coefficient table as the coefficient of the secondary term or the primary term for the calculation.

8. The optical switch system according to claim 6, wherein the correction quantity obtaining portion performs the calculation based on the following equation, $$\Delta VT(N) = K1 \times [VT(N-1)]2 + K2 \times [VT(N-1)] + K3 \times [VT(N+1)]2 + K4 \times [VT(N+1)],$$

where, N represents a channel of the micro mirror to be a target, $\Delta VT(N)$ represents its correction quantity, $VT(N-1)$ represents a voltage value that is applied to a micro mirror of an N−1 channel, and $VT(N+1)$ represents a voltage value that is applied to a micro mirror of an N+1 channel and K1-K4 are coefficients.

9. The optical switch system according to claim 6, wherein the correction quantity obtaining portion performs the calculation based on the following equation, $$\Delta VT(N) = K1[VT(N-1)/VT(N)]2 + K2[VT(N-1)/VT(N)] + K3[VT(N+1)/VT(N)]2 + K4[VT(N+1)/VT(N)],$$

where, N represents a channel of the micro mirror to be a target, $\Delta VT(N)$ represents its correction quantity, $VT(N-1)$ represents a voltage value that is applied to a micro mirror of an N−1 channel, $VT(N+1)$ represents a voltage value that is applied to a micro mirror of an N+1 channel, and K1-K4 are coefficients.

10. The optical switch system according to claim 6, wherein the correction quantity obtaining portion performs the calculation based on the following equation, $$\Delta VT(N) = K1[VT(N-1) - VT(N)]2 + K21[VT(N-1) - VT(N)]1 + K3[VT(N+1) - VT(N)]2 + K41[VT(N+1) - VT(N)]1,$$

where, N represents a channel of the micro mirror to be a target, $\Delta VT(N)$ represents its correction quantity, $VT(N-1)$ represents a voltage value that is applied to a micro mirror of an N−1 channel, $VT(N+1)$ represents a voltage value that is applied to a micro mirror of an N+1 channel, and K1-K4 are coefficients.

11. The optical switch system according to claim 5, wherein the computing portion determines a control angle of the micro mirror from the connection information, performs a filtering process on the determined control angle for reducing a mechanical resonance of a micro mirror, and performs a correction on the control angle after the filtering process or a voltage value corresponding to the control angle using the correction quantity.

12. An optical switch system having a plurality of micro mirrors arranged in a plane, in which an angle of each of the micro mirrors can be controlled for reflecting an optical signal entered from one or more input ports so that the reflected optical signal enters a selected output port of one or more output ports, the optical switch system comprising:
    a storage portion for storing connection information between the input port and the output port;

a control angle obtaining portion for obtaining a control angle of the micro mirror based on the connection information;

a filter portion for performing a filtering process on the control angle so as to reduce a mechanical resonance of the micro mirror;

a θV conversion portion for converting the control angle after the filtering process into a voltage value;

a drive output portion for driving the micro mirror based on the voltage value; and a correction quantity obtaining portion for determining a correction quantity for a cross talk generated due to a voltage that is applied to a neighboring micro mirror among the plurality of micro mirrors, wherein the correction quantity obtaining portion determines the correction quantity by calculating a sum of a secondary term and a primary term of a control angle of a micro mirror neighboring to the micro mirror to be a target or a voltage value corresponding to the control angle, and the determined correction quantity is used for the control angle or the voltage value of the micro mirror to be a target so that a drive quantity of the micro mirror to be a target is corrected.

13. The optical switch system according to claim 12, further comprising a coefficient table storing coefficients that are used for calculation of the correction quantity, wherein the correction quantity obtaining portion uses the coefficient read out of the coefficient table as the coefficient of the secondary term or the primary term for the calculation.

* * * * *